United States Patent [19]

Blasko et al.

[11] Patent Number: 5,098,956
[45] Date of Patent: Mar. 24, 1992

[54] POLYOL BLENDS OF LOW TG AND HIGH TG ACRYLIC COPOLYMERS

[75] Inventors: John E. Blasko, Racine County; Robert E. Karabetsos, Kenosha County; Douglas B. Rahrig, Caledonia Township, Racine County, all of Wis.

[73] Assignee: S.C. Johnson & Son, Inc., Racine, Wis.

[21] Appl. No.: 614,570

[22] Filed: Nov. 14, 1990

Related U.S. Application Data

[60] Continuation of Ser. No. 507,009, Apr. 10, 1990, abandoned, which is a continuation of Ser. No. 335,339, Apr. 10, 1989, abandoned, which is a division of Ser. No. 147,374, Jan. 22, 1988, abandoned.

[51] Int. Cl.$^5$ .................. C08F 8/30; C08L 75/00; C08L 61/00; C08L 33/14
[52] U.S. Cl. .................. 525/123; 525/155; 525/162; 525/223
[58] Field of Search ............ 525/123, 155, 162, 223

[56] References Cited

U.S. PATENT DOCUMENTS

| | | | |
|---|---|---|---|
| 4,529,787 | 7/1985 | Schmidt et al. | 526/209 |
| 4,565,730 | 1/1986 | Poth et al. | 525/125 |
| 4,649,045 | 3/1987 | Gaske et al. | 525/223 |

FOREIGN PATENT DOCUMENTS 1515868  6/1978  United Kingdom .

*Primary Examiner*—Marion E. McCamish
*Assistant Examiner*—Susan Berman

[57] ABSTRACT

A polyol blend, comprising a low-Tg high-hydroxyl number acrylic copolymer and a high-Tg low-hydroxyl number acrylic copolymer, is disclosed. The low-Tg and high-Tg acrylic copolymers each comprise a hydroxyalkyl acrylate or methacrylate, and a non-hydroxy moiety-containing alkyl methacrylate. The low-Tg copolymer has a hydroxyl number of about 112 to about 187, a number-average molecular weight of about 1500 to about 6000, a polydispersity value of no greater than about 5, and a Tg of about −10° to about 20° C. The high-Tg copolymer has a hydroxyl number of about 35 to about 112, a number-average molecular weight of about 2000 to about 8000, a polydispersity value of no greater than about 5, and a Tg of about 25° to about 100° C. Also disclosed are coating compositions comprising the polyol blend.

4 Claims, 2 Drawing Sheets

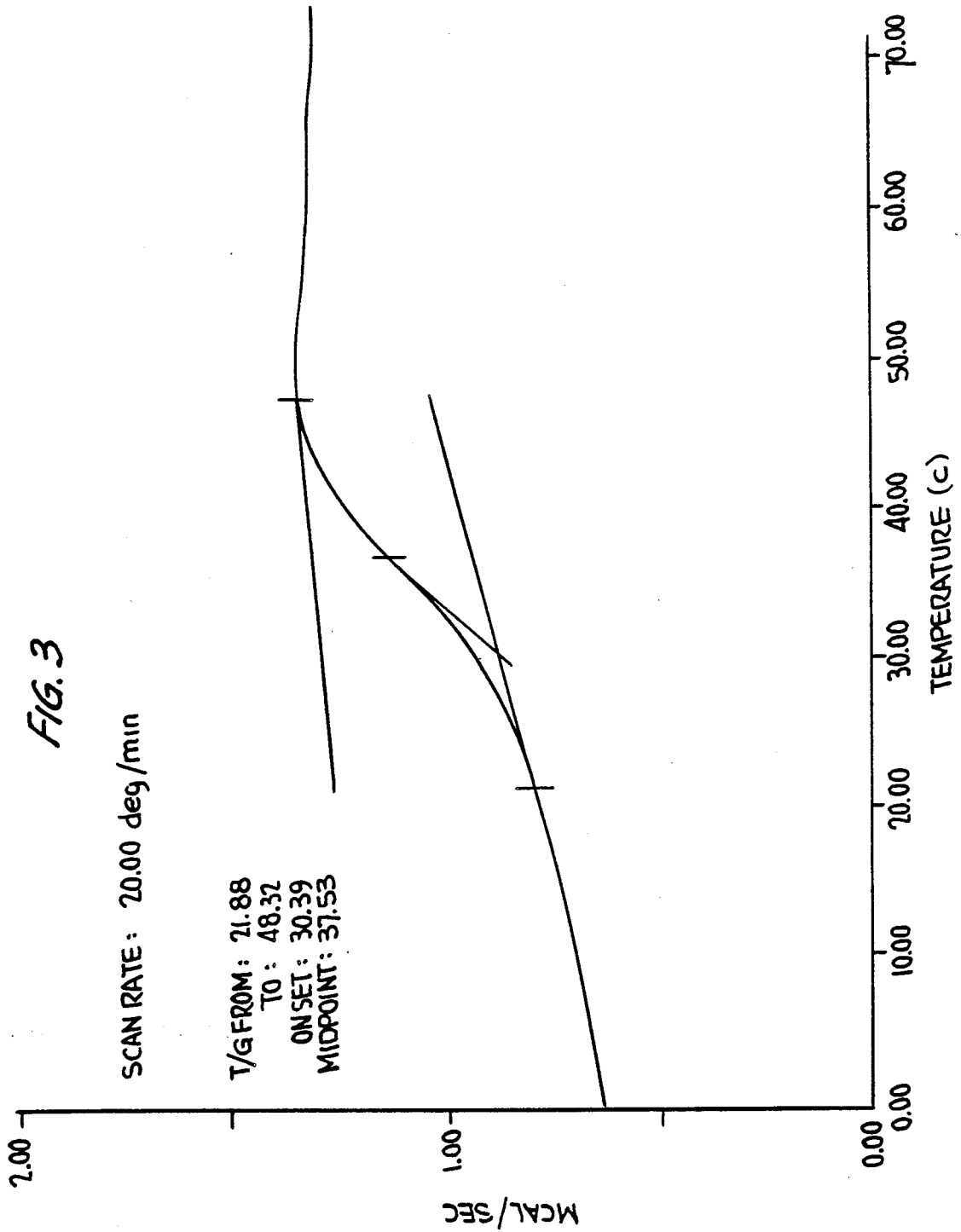

POLYOL BLENDS OF LOW TG AND HIGH TG ACRYLIC COPOLYMERS

REFERENCE TO RELATED APPLICATIONS

This application is a continuation of U.S. application Ser. No. 07/507,009 (now abandoned) filed Apr. 10, 1990, which is a continuation of U.S. application Ser. No. 07/335,339 (now abandoned) filed Apr. 10, 1989, which is a division of U.S. application Ser. No. 07/147,374 (now abandoned) filed Jan. 22, 1988, the benefit of which is now claimed for purposes of priority pursuant to 35 USC 120.

FIELD OF THE INVENTION

This invention generally relates to polyol blends of acrylic copolymers. More particularly, the present invention relates to polyol blends of (1) a low glass-transition temperature (Tg), high hydroxyl-number acrylic copolymer and (2) a high Tg, low hydroxyl-number acrylic copolymer, such blends being suitable for use in the coatings industry. Yet another aspect of this invention relates to high solids coating compositions comprising the polyol blends of the invention, to which can be added a suitable cross-linking agent such as a polyisocyanate or an amino resin.

BACKGROUND OF THE INVENTION

Conventional organic solvent-based industrial finishes and coatings have presented many problems to date. For example, organic solvents can pollute the workplace and environment; many are readily ignitable; some are toxic; and many are quite expensive. Some of these conventional organic solvents, that are added to a coating or finish composition, can lower the quality of the finish. They also can, at times, undesirably add color to an otherwise clear finish.

As a replacement for conventional organic solvent-based finishes, one of the trends in the polymer industry has been toward producing so-called "high solids", solvent-borne coating compositions. Yet another trend in the polymer industry has been toward producing water-based coatings.

While water-based coatings are often preferred, from an environmental standpoint, the use of water-based coatings is not always preferred from an applications or end-use standpoint. For example, the maximum "solids" content of many water-based coatings is about 50-55 wt.-% solids, based on total weight of the composition; and a particular application or end-use might prefer a higher wt.-% solids content.

Second, most water-based coatings require that certain other ingredients (such as surfactants, emulsifiers, and the like) be added to the coating composition formulation, to enable the water-based ingredients to be compatible with the organic-based ingredients, for the coating composition. The result of including the above-mentioned additional ingredients, that are required from an ingredient-compatibility standpoint, is that the overall coating properties are often undesirably affected. For example, most conventional water-based coatings are unable to achieve certain high-gloss levels, achievable by many conventional solvent-based coatings. Depending upon a particular application or end-use, therefore, use of a water-based coating may be particularly undesirable.

Third, depending, of course, upon the application or end-use, the 50–55 wt.-% solids level of the water-based coatings might be unattractive for economic or other business reasons, rendering the relatively-higher wt.-% organic-based coatings the coatings-of-choice.

The high-solids, solvent-borne coating compositions typically have a solids content of about 70 wt.-% (nonvolatiles), based upon total weight of the coating composition. The present invention is concerned with high solids, solvent-borne coating compositions of this type.

High solids solvent-borne coating compositions provide significant advantages over conventional, organic solvent-thinned coating compositions. For example, high solids solvent-borne coating compositions do not pollute the air as much as the solvent-thinned coating compositions (which include significantly more solvent). Rather, the high-solids solvent-borne coating compositions have been found to significantly reduce discharge of undesirable solvent fumes, when being applied as a film or coating to a substrate.

It has been demonstrated, moreover, that the preparation of these high-solids solvent-borne coating compositions results in generally reduced energy requirements (for their preparation) in terms of material, energy expended and labor that is required, as compared to conventional organic solvent-thinned industrial finishes and other coating systems that are organic solvent thinned.

Furthermore, unlike organic solvent-thinned systems, the high-solids solvent-borne coating compositions generally present less of a fire hazard as well as less of a toxicity problem.

It has also been demonstrated that high solids solvent-borne coating compositions can provide substantial advantages over certain other conventional coatings systems. Such conventional coating systems include the so-called "solventless" coatings systems, the so-called "water-borne" systems, certain powder systems, and the so-called "non-aqueous" dispersion systems. For example, in certain applications, the high-solids solvent-borne coating compositions have been shown to provide a better overall balance of properties over the conventional coating systems briefly mentioned above.

Another major problem that the coatings industry is faced with at present, moreover, is the manufacture of relatively high solids coating compositions which have a low viscosity. Generally, the trade-off for making high solids coating compositions (which is the desired result in certain applications or end-uses) has been to provide a more viscous coating composition (which is undesired, yet generally necessary, to achieve the desired result). Of course, organic solvent can be added to reduce viscosity; but current government regulations generally severely limit the extent to which such solvent addition is permissible.

A high viscosity coating composition is disadvantageous, as can be appreciated. The disadvantage that results from use of a highly viscous composition is particularly noticeable in the manufacture of coating compositions having so-called "after-market" applications or end-uses. For example, coatings for after-market applications generally require, among other things, low viscosity, rapid air-dry time, and extended pot-life. Low viscosity is desired so as to obtain the particular set of flow properties that are desired. The term "extended pot-life" as used herein means that the coating composition ingredients, after being mixed or otherwise combined, do not gel or otherwise set-up until after about 3 to about 8 hours after being so combined, thereby enabling about 3 to about 8 hours to pass between the time that the composition ingredients are combined and the time that the composition is applied to a substrate. The relative term "rapid air-dry time" is generally understood to mean that procedure whereby the coating composition becomes dry, virtually at the time that the composition is applied to a substrate, resulting in a substantially tack-free and dust-free finish virtually at the time of application.

Thus, a particularly significant problem that the coatings industry is currently addressing is the problem of how to manufacture certain high-solids coating compositions which are able to provide superior coating finishes, yet at the same time, meet government environmental regulations. For example, commercially-acceptable after-market air-dryable coating compositions must possess, among other qualities, a low viscosity, an extended pot-life, and a rapid air-dry time at ambient temperatures. It can be appreciated that ambient temperatures can greatly be affected by locale and season. Furthermore, such coating compositions must provide good weathering capabilities, as measured by gloss-retention after application. Still further, such coating compositions must possess sufficient hardness for their particular application or end-use.

Additionally, such coatings compositions must be relatively high-solids, i.e. at least up to a specified "minimum solids" content, so as to meet government regulations. That is, the coating compositions must, for example, meet certain governmentally-imposed compositional requirements or regulations, one such regulation being generally referred to in connection with the amount of Volatile Organic Compounds (VOCs) that are present in the coating composition. In particular, the VOC requirement defines the acceptable limits of volatile materials allowed in such coating composition.

Until the discovery of our invention, however, it had not been thought possible to be able to provide superior, economically-feasible air-dryable coating compositions having a good balance of the above-mentioned commercially-acceptable attributes yet which is also able to meet governmental regulations as well.

Polyols of acrylic copolymers as well as acrylic polyol copolymer blends for preparing high-solids coating compositions are well-known in the art. Such prior-art polyols, however, while useful in certain applications (e.g. high temperature-cured or so-called "stoved" coatings end-uses or applications), have generally not performed well from an overall performance standpoint, particularly where the end-use or application demands that the coating composition be air-dryable, possess high solids content, and demonstrate reduced viscosity and extended pot-life.

As used herein, the term "stoved" means, after an application of an effective or sufficient amount of heat, that a particular solvent is driven off without the coating composition becoming heat-cured.

U.S. Pat. Nos. 4,529,787 (to Schmidt et al.) and 4,546,160 (to Brand et al.), both patents having been assigned to S. C. Johnson and Son, Inc., of Racine, Wis. (the assignee of this application), disclose processes for or methods of making acrylic copolymers that are useful in preparing coating compositions having high solids, low molecular weight, narrow molecular weight distribution, and controlled viscosity. These acrylic copolymers, sometimes referred to as "stand-alone" acrylic copolymers, have generally been found to be extremely useful in connection with the production of certain coatings, for a variety of applications. Yet, in certain other applications, such as those end-uses or applications requiring that a particular coating composition be air-dryable, there is currently a need to provide a polyol which will enable the coating composition to have acceptably low viscosity, extended pot-life, and comparable-to-conventional or improved weathering capabilities. Typically, gloss-retention and hardness values are measured to determine whether the coating composition will be acceptable to a consumer or other end-user.

The prior art teaches the use of acrylic copolymer blends, for use in connection with coating compositions. In particular, U.S. Pat. No. 4,565,730 (to Poth et al.) discloses a wet-on-wet method for applying a clear lacquer coating composition over a pigment-containing base coat for use in heat-cured or stoved original-equipment manufacture (OEM) end-uses or applications.

The '730 patent, still more particularly, discloses a so-called "binder" consisting essentially of two acrylic polymers and a polyisocyanate. The first acrylic polymer has a molecular weight of 800 to 4000, a hydroxyl number of 80 to 180, and a Tg (i.e., glass-transition temperature) below $-10°$ C. The first acrylic polymer is prepared from 75% to 100% by weight of acrylic acid esters and 0% to 25% by weight of methyacrylic acid esters. The second acrylic polymer has a molecular weight of 3,000 to 10,000, a hydroxyl number of 40 to 120, and a Tg of $-10°$ C. to $+10°$ C. The second acrylic polymer is prepared from 0% to 30% by weight of acrylic acid esters and 70% to 90% by weight of methacrylic acid esters The composition that is disclosed in the '730 patent differs substantially from that which is disclosed herein because, among other things, the first and second acrylic copolymers of the present invention require, in contradistinction to what is disclosed in the '730 patent, different glass transition temperatures, different molecular weights, different proportions of the copolymers that are utilized, and different proportions of the monomers that are utilized to make up the copolymers disclosed herein.

Furthermore, not disclosed—or even suggested—in the '730 patent are certain features or advantages of the present invention, which will be discussed presently. For example, as one such feature or advantage, the acrylic copolymers of the present invention include, among other things, polyol blends having a low polydispersity value. Those skilled in the art can appreciate the desirability of a low polydispersity value, particularly for certain end-uses or applications.

Another feature or advantage of the present invention is that the acrylic copolymer and polyol blends disclosed herein comprise a low Tg copolymer and a high Tg copolymer, having different hydroxyl numbers. Additionally, the polyol blends of the present invention have a solids content which is relatively greater than that disclosed in the '730 patent, which is highly desirable for certain end-uses.

Additional patents, known in the art, which disclose acrylic copolymers for use in coating compositions include U.S. Pat. No. Re. 31,309 (to Antonelli et al.); U.S. Pat. No. 3,284,415 (to Horvath); U.S. Pat. No. 3,632,789 (to Wilhelm et al.); U.S. Pat. No. 3,773,710 (to Victorius); U.S. Pat. No. 3,846,368 (to Pettit); U.S. Pat. No. 3,919,351 (to Chang et al.); U.S. Pat. No. 3,998,768 (to Pettit); U.S. Pat. No. 4,404,248 (to Spinelli et al.); U.S. Pat. No. 4,415,697 (to Peng et al.); U.S. Pat. No. 4,330,458 (to Spinelli et al.); U.S. Pat. No. 4,649,045 (to Gaske et al.); and U.S. Pat. No. 4,670,512 (to McFadden). The acrylic copolymers disclosed in these patents, however, are significantly different from the present invention in composition, function, and/or application or end-use. These patents do not disclose—or suggest—moreover, the polyol blends of the present invention.

PRIMARY OBJECTS OF THE INVENTION

Accordingly, there is a need in the coatings industry for air-dryable coating compositions. There is also a need for polyols which, when mixed with suitable cross-linking agents, are able to provide coating compositions which have high solids yet relatively low viscosity. It would also be desirable that such coating compositions include relatively low levels of volatile materials. It would further be desirable that such coating compositions be able to provide extended pot-life, rapid air-dry time at ambient temperatures, improved weathering properties as measured by gloss retention, and good hardness. The polyol blend of the present invention, which can be utilized as an ingredient in a coating composition, meets these requirements.

The polyol blends of the present invention have been found, to be particularly useful, for example, in connection with the manufacture of certain high-solids coating compositions. That is, the polyol blends disclosed herein have been found to be particularly useful in the manufacture of clear and pigmented air-dryable coating compositions. The polyol blends of the present invention are also particularly useful in the manufacture of baked coating compositions.

The polyol blends of the present invention find particular usefulness when formulated into so-called "maintenance" coating compositions, for use in a wide variety of after-market applications such as bridges, water towers, and the like. The coating compositions disclosed herein, formulated from the polyol blends of the present invention, are, moreover, particularly suitable for application to most of the currently-available business machines, a wide variety of household appliances, transportation equipment such as trucks, locomotives, and the like, and many other articles of manufacture which need applications of an other-than-original coating composition.

While the advantages of the extended pot-life and rapid air-dry time, as provided by the polyol blends of the present invention, are not as important in many OEM applications, the polyol blends of the invention have demonstrated general utility in such applications due to, among other things, certain economic advantages inherently provided. For example, in the preparation of the polyol blends of the coating compositions of the present invention there is a relatively lower organic solvent demand due to the lower inherent viscosity. Another inherent advantage can result, in certain instances, from a generally lower cross-linking agent demand, which manifests itself in certain end-uses. For example, in one such particular end-use, a lower agent demand arises as a result of improved coating performance at a higher equivalent weight.

Accordingly, it is a general object of the present invention to provide a polyol blend comprising (1) a low Tg, high hydroxyl content acrylic copolymer and (2) a high Tg, low hydroxyl content acrylic copolymer, wherein such polyol blend is extremely useful when mixed or otherwise combined with a suitable cross-linking agent, to provide a superior high-solids, low-viscosity air-dryable coating composition.

It has been discovered that compatible blends of low Tg and high Tg acrylic copolymers can be prepared when the polymerization process of the low Tg copolymer and high Tg copolymer are so controlled as to provide low Tg and high Tg acrylic copolymers having certain properties. In particular, the low Tg acrylic copolymer has a hydroxyl number in the range of about 112 to about 187, a number-average molecular weight (Mn) of about 1500 to about 6000, a polydispersity value of no greater than about 5, and a Tg in the range of about $-10°$ C. to about $20°$ C. The high Tg acrylic copolymer has a hydroxyl number in the range of about 35 to about 112, a Mn of about 2000 to about 8000, a polydispersity value of no greater than about 5, and a Tg in the range of about $25°$ C. to about $100°$ C.

The term "polydispersity", abbreviated Mw/Mn, is the ratio of the weight-average molecular weight to the number-average molecular weight.

Yet another object of the present invention is to provide polyol blends of (1) a low-Tg, high-hydroxyl number acrylic copolymer and (2) a high-Tg, low-hydroxyl number acrylic copolymer, wherein the manufacture of such polyol blends results in a reduction in organic solvent (volatiles), in the ultimate coating composition, wherein such volatiles would otherwise be required in the manufacture of air-dryable coatings. That is, a reduction in the organic solvent requirements is achieved, in accordance with the above-stated discussion and in accordance with the principles of the present invention, due to the inherently lower viscosity achieved by use of the polyol blends of the present invention.

It is a further object of the present invention to provide superior air-dryable coating compositions comprising polyol blends of the invention, and suitable cross-linking agents such as polyisocyanates.

A related object is to provide superior bakable coating compositions comprising polyol blends of the invention and suitable thermally-activated cross-linking agents such as "amino" (e.g., aminoplast-type) resins.

Still another object of the present invention is to provide improved air-dryable coating compositions using polyol blends of the invention, wherein such coating compositions provide extended pot-life, rapid air-dry time, improved weathering capabilities, as measured by gloss retention, and wherein such coating compositions possess good hardness.

Yet another object of the present invention is to provide polyol blends of (1) a low-Tg, high-hydroxyl number acrylic copolymers and (2) a high-Tg, low-hydroxyl number acrylic copolymers, wherein such copolymers can be simply and economically manufactured, for end-use in coating compositions.

Still other objects and advantages of the present invention will become apparent upon reading the present specification and upon reference to the accompanying FIGURES.

SUMMARY OF THE INVENTION

The polyol blend of the present invention comprises (I) an acrylic copolymer having a low Tg and a high hydroxyl number and (II) an acrylic copolymer having a high Tg and a low hydroxyl number.

In the blend, the low-Tg, high-hydroxyl number acrylic copolymer is present in an amount of about 5 wt.-% to about 95 wt.-%, preferably about 14 wt.-% to about 86 wt.-%, and more preferably about 30 wt.-% to about 70 wt.-%, based upon the total weight of the blend.

The low-Tg, high-hydroxyl number acrylic copolymer comprises (1) a hydroxyalkyl acrylate or methacrylate, (2) a non-hydroxy moiety-containing alkyl acrylate, (3) a non-hydroxy moiety-containing alkyl methacrylate, (4) an aromatic moiety-containing monomer, and (5) an alpha, beta-ethylenically unsaturated acid.

The hydroxyalkyl acrylate or methacrylate, present in an amount of about 20 wt.-% to about 50 wt.-% based upon the total weight of the low-Tg, high-hydroxyl number acrylic copolymer, is selected from the group consisting of hydroxyethyl acrylate, hydroxypropyl acrylate, hydroxyethyl methacrylate, hydroxypropyl methacrylate, and mixtures thereof.

The non-hydroxy moiety-containing alkyl acrylate is present in an amount of about 10 wt.-% to about 40 wt.-%, based upon the total weight of the low-Tg, high-hydroxyl number acrylic copolymer.

The non-hydroxy moiety-containing alkyl methacrylate is present in an amount of about 20 wt.-% to about 70 wt.-%, based upon the total weight of the low-Tg, high-hydroxyl number acrylic copolymer.

The aromatic moiety-containing monomer is present in an amount of about 0 wt.-% to about 30 wt.-%, based upon the total weight of the low-Tg, high-hydroxyl number acrylic copolymer.

The alpha, beta-ethylenically unsaturated acid is present in an amount of about 0 wt.-% to about 5 wt.-%, based upon the total weight of the low-Tg, high-hydroxyl number acrylic copolymer.

The low-Tg, high-hydroxyl number acrylic copolymer has a hydroxyl number of about 112 to about 187, a number-average molecular weight of about 1500 to about 6000, a polydispersity value of no greater than about 5, and a Tg in the range of about $-10°$ C. to about $+20°$ C.

In the blend, the high-Tg, low-hydroxyl number acrylic copolymer is present in an amount of about 5 wt.-% to about 95 wt.-%, preferably about 14 wt.-% to about 86 wt.-%, and more preferably about 30 wt.-% to about 70 wt.-%, based upon the total weight of the blend.

The high-Tg, low-hydroxyl number acrylic copolymer comprises (1) a hydroxyalkyl acrylate or methacrylate, (2) a non-hydroxy moiety-containing alkyl methacrylate, (3) a non-hydroxy moiety-containing alkyl acrylate, (4) an aromatic moiety-containing monomer, and (5) an alpha, beta-ethylenically unsaturated acid.

The hydroxyalkyl acrylate or methacrylate, present in an amount of about 7 wt.-% to about 29 wt.-% based upon the total weight of the high-Tg, low-hydroxyl number acrylic copolymer, is selected from the group consisting of hydroxyethyl acrylate, hydroxypropyl acrylate, hydroxyethyl methacrylate, hydroxypropyl methacrylate, and mixtures thereof.

The non-hydroxy moiety-containing alkyl methacrylate is present in an amount of about 20 wt.-% to about 70 wt.-%, based upon the total weight of the high-Tg, low-hydroxyl number acrylic copolymer.

The non-hydroxy moiety-containing alkyl acrylate is present in an amount of about 0 wt.-% to about 25 wt.-%, based upon the total weight of the high-Tg, low-hydroxyl number acrylic copolymer.

The aromatic moiety-containing monomer is present in an amount of about 0 wt.-% to about 30 wt.-%, based upon the total weight of the high-Tg, low-hydroxyl number acrylic copolymer.

The alpha, beta-ethylenically unsaturated acid is present in an amount of about 0 wt.-% to about 5 wt.-%, based upon the total weight of the high-Tg, low-hydroxyl number acrylic copolymer.

The high-Tg, low-hydroxyl number acrylic copolymer has a hydroxyl number of about 35 to about 112, a number-average molecular weight of about 2000 to about 8000, a polydispersity value of no greater than about 5, and a Tg in the range of about $+25°$ C. to about $+100°$ C.

The high solids coating compositions of the invention comprises a mixture of the polyol blend of the invention with a cross-linking agent such as a polyisocyanate or an amino resin.

GENERAL DESCRIPTION OF THE INVENTION

The polyol blend of the present invention comprises a physical mixture of about 5 wt.-% to about 95 wt.-%, preferably about 14 wt.-% to about 86 wt.-%, more preferably about 30 wt.-% to about 70 wt.-%, of each of the above-characterized (I) low-Tg, high-hydroxyl number and (II) high-Tg, low-hydroxyl number acrylic copolymers, based upon total weight of the blend.

The above-summarized polyol blend, when used to formulate coating compositions, will provide high-solids, low-viscosity coating compositions, wherein such coating compositions include a desirable, minimal amount of volatile substances or materials, provided that certain conditions are met.

One such condition is that the low-Tg, high-hydroxyl number acrylic copolymer have (1) a hydroxyl number of about 112 to about 187 (such a hydroxyl number provides an equivalent weight in the range of about 300 to about 500), (2) a number-average molecular weight (Mn) of about 1500 to about 6000, (3) a polydispersity value (Mw/Mn) of no greater than about 5, and (4) a glass-transition temperature (Tg) of about $-10°$ C. to about $+20°$ C.

In particular, in the low-Tg acrylic copolymer, the hydroxyl number of about 112 provides an equivalent weight of about 500; and the hydroxyl number of about 187 provides an equivalent weight of about 300.

Preferably, the low-Tg, high-hydroxyl number acrylic copolymer has a hydroxyl number of about 125 to about 160 (which provides an equivalent weight of about 350 to about 450). The low-Tg acrylic copolymer further preferably has an Mn of about 1500 to about 4000, and a polydispersity value, preferably, of no more than about 3. The preferred Tg is about $0°$ C. to about $+20°$ C.

Another condition is that the high-Tg, low-hydroxyl number acrylic copolymer have (1) a hydroxyl number of about 35 to about 112 (which provides an equivalent weight of about 500 to about 1600), (2) an Mn of about 2000 to about 8000, (3) a polydispersity value of no more than about 5, and (4) a Tg of about $+25°$ C. to about $+100°$ C.

In the high-Tg acrylic copolymer, the hydroxyl number of about 35 provides an equivalent weight of 1600, and the hydroxyl number of about 112 provides an equivalent weight of about 500.

Preferably, the high-Tg, low-hydroxyl number acrylic copolymer has a hydroxyl number of about 47 to about 80 (which provides an equivalent weight of about 700 to about 1190). The high-Tg acrylic copolymer further preferably has an Mn of about 2000 to about 6000, more preferably of about 2000 to about 4500. The preferred polydispersity value is no more than about 3.5; and the preferred Tg is about $+25°$ C. to about $+50°$ C.

The molecular weights of the acrylic copolymers of the polyol blends of the present invention were determined by conventional gel-permeation chromatography (GPC) techniques.

The glass-transition temperatures (Tg) of the acrylic copolymers were determined utilizing conventional differential-scanning calorimeter (DSC) techniques at a scan rate of 20° C. per minute.

The polyol blends were prepared at a solids content in the range of about 65% to about 85% solids. The preferred range of the solids content is between about 70% and about 81% solids.

Our solids determination is based upon a conventional test procedure, whereby about 0.3 to about 1.0 grams of each polyol blend sample was heated at a temperature of about 150° C. for one hour. The solids content of the polyol blend can be adjusted to the desired solids level by addition of a suitable solvent that is acceptable for a particular coating composition end-use.

The monomers making up the low-Tg acrylic copolymer include about 20% to about 50%, preferably about 25% to about 40%, by weight, of at least one hydroxyalkyl acrylate or methacrylate, provided that the copolymer has a hydroxyl number of about 112 to about 187. The low-Tg acrylic copolymer further includes about 10% to about 40%, preferably about 15% to about 35%, by weight, of a non-hydroxy moiety-containing alkyl acrylate. The low-Tg acrylic copolymer still further includes about 20% to about 70%, preferably about 20% to about 50%, by weight, of a non-hydroxy moiety-containing alkyl methacrylate. Additional comonomers which may be utilized in the low-Tg acrylic copolymer include aromatic moiety-containing monomers, in the amount of about 0% to about 30%, preferably about 0% to about 20%, by weight of the low Tg acrylic polymer; and alpha, beta-ethylenically unsaturated acids in the amount of about 0% to about 5%, preferably about 0% to about 3%, based upon the total weight of the low-Tg acrylic copolymer.

The monomers making up the high-Tg acrylic copolymer include from about 7% to about 29%, preferably about 10% to about 24%, by weight, of at least one hydroxyalkyl acrylate or methacrylate, provided that the copolymer has a hydroxyl number of about 35 to about 112. The high-Tg acrylic copolymer includes as other monomers, about 20% to about 70%, preferably about 30% to about 60%, by weight, of a non-hydroxy moiety-containing alkyl methacrylate; and from about 0% to about 25%, preferably 10% to 20%, by weight of a nonhydroxy containing alkyl acrylate. Additional monomers which may be used in the high-Tg acrylic copolymer are aromatic moiety-containing monomers, in the amount of about 0% to about 30%, preferably about 0% to about 25%, based upon the total weight of the high Tg acrylic copolymer; and alpha, beta-ethylenically unsaturated acids in the amount of about 0% to about 5%, preferably about 0% to about 3%, by weight of the high-Tg copolymer.

Suitable hydroxyalkyl acrylates or methacrylates for the low-Tg acrylic copolymer, and for the high-Tg acrylic copolymer, include hydroxyethyl acrylate, hydroxypropyl acrylate, hydroxyethyl methacrylate, hydroxypropyl methacrylate, and mixtures thereof. A preferred hydroxyalkyl acrylate, for each of the low-Tg and high-Tg acrylic copolymers, is hydroxyethyl acrylate.

Suitable non-hydroxy moiety-containing alkyl acrylates, for purposes of the present invention, include alkyl acrylates having 1 to 12 carbon atoms in the alkyl group thereof. Such non-hydroxy moiety-containing alkyl acrylates, for each of the low-Tg and the high-Tg acrylic copolymers, include, but are not limited to, methyl acrylate, ethyl acrylate, n-propyl acrylate, isopropyl acrylate, n-butyl acrylate, isobutyl acrylate, sec-butyl acrylate, tert-butyl acrylate, n-pentyl acrylate, neopentyl acrylate, n-hexyl acrylate, cyclohexyl acrylate, n-octyl acrylate, 2-ethylhexyl acrylate, lauryl (n-dodecyl) acrylate, isobornyl acrylate, and mixtures thereof.

Preferred non-hydroxy moiety-containing alkyl acrylates, for each of the low-Tg and high-Tg acrylic copolymers, are selected from the group consisting of ethyl acrylate, n-butyl acrylate, n-hexyl acrylate, 2-ethylhexyl acrylate, isobornyl acrylate, and mixtures thereof.

Suitable non-hydroxy moiety-containing alkyl methacrylates, for purposes of the present invention, include alkyl methacrylates having 1 to 12 carbon atoms of the alkyl group thereof. Such non-hydroxy moiety-containing alkyl methacrylates, for each of the low-Tg and the high-Tg acrylic copolymers, include but are not limited to, methyl methacrylate, ethyl methacrylate, n-propyl methacrylate, isopropyl methacrylate, n-butyl methacrylate, isobutyl methacrylate, sec-butyl methacrylate, tert-butyl methacrylate, n-pentyl methacrylate, neopentyl methacrylate, n-hexyl methacrylate, cyclohexyl methacrylate, n-octyl methacrylate, 2-ethylhexyl methacrylate, lauryl (n-dodecyl) methacrylate, isobornyl methacrylate, and mixtures thereof.

Preferred non-hydroxy moiety-containing alkyl methacrylates, for each of the low-Tg and high-Tg acrylic copolymers, are selected from the group consisting of methyl methacrylate, n-butyl methacrylate, ethyl methacrylate, and mixtures thereof.

Suitable aromatic moiety-containing comonomers, for each of the low-Tg and high-Tg acrylic copolymers of the present invention, are selected from the group consisting of styrene, alpha-methyl styrene, para-methyl styrene, and mixtures thereof. A preferred aromatic moiety-containing comonomer, for each of the low-Tg and high-Tg copolymers of the present invention, is styrene.

Suitable alpha, beta-ethylenically unsaturated acids, for each of the low-Tg and high-Tg acrylic copolymers of the present invention, include, but are not limited to, acrylic acid (AA), methacrylic acid (MAA), fumaric acid, crotonic acid, itaconic acid, maleic acid, cinnamic acid, 2,3-bis-(para-methoxyphenyl)-acrylic acid, meta-phenylene diacrylic acid, oleic acid, and the like, and mixtures.

The low-Tg and high-Tg acrylic copolymers of the polyol blends of the invention can be prepared utilizing conventional polymerization processes. A preferred process for preparing the acrylic copolymers, of the polyol blends of the present invention, are those so-called "bulk" polymerization processes that are described in U.S. Pat. Nos. 4,529,787 (to Schmidt et al.) and 4,546,160 (to Brand et al.), which patent disclosures are hereby incorporated by reference. These polymerization processes provide copolymers which have enhanced yields of high solids (solids up to about 99% of theoretical), low non-volatile content, low molecular weight, narrow molecular weight distribution, and a low chromophore content.

Generally, the process of making each of the low-Tg and high-Tg acrylic copolymers by bulk polymerization involves charging into a continuous mixed reactor zone containing a molten resin mixture a mixture of monomers, initiator, and a reaction solvent. The monomers are as above described, for each of the low-Tg and high-Tg acrylic copolymers.

A suitable initiator is an alkyl peroxide. In particular, one such alkyl peroxide, namely di-tertiary butyl peroxide, is added to the reaction zone in an amount that is sufficient to provide a molar ratio of the initiator to the monomer mixture of from about 0.0005:1 to about 0.06:1.

A suitable reaction solvent, such as methyl n-amyl ketone, is provided in an amount of from about 0% to about 25%, based on the weight of the monomers in the reaction solvent.

In at least one of these processes, a sufficient flow rate of the reaction mixture is maintained through the reactor zone so as to: (i) provide a residence time of the charged mixture in the reactor zone of from about 2 minutes to about one hour; (ii) maintain a predetermined level of reaction mixture in the reaction zone; and (iii) maintain the molten resin mixture in a reaction temperature range of from about 180° C. to about 270° C.

The low-Tg and high-Tg acrylic copolymer products prepared by such process are then separated from unreacted monomers and reaction by-products. This process is used to produce each of the low-Tg and high-Tg acrylic copolymer compositions described herein, adjusting the residence time and reaction temperature as is needed to yield low-Tg and high-Tg acrylic copolymers having the desired properties set forth above. The low-Tg and high-Tg acrylic copolymers are then cut with an organic solvent to desired solids level. For purposes of the present invention, the low-Tg and high-Tg acrylic copolymers are each cut with a suitable organic solvent so as to achieve, in the ultimate polyol blend, a solids level in the range of about 46% to about 87% solids. (For purposes of the present invention, the term "cut", as used immediately above, means to be dissolved in.)

Useful organic solvents, for purposes of the present invention, are those organic solvents that are utilized in connection with conventional so-called "protective" coating compositions. One such organic solvent is methyl n-amyl ketone (MAK).

After each is cut with a suitable organic solvent, the low-Tg and high-Tg acrylic copolymers are physically blended together with agitation and heat sufficient to enhance the mixing but below the boiling temperature of the solvent. The ratio of low-Tg acrylic copolymer to high-Tg acrylic copolymer is chosen so as to produce the 5 to 95 wt.-%, 14 to 86 wt.-%, and 30 to 70 wt.-% values discussed hereinabove. The above-discussed process, including additional suitable initiators and solvents, is set forth more specifically in the above-referenced U.S. Pat. Nos. 4,529,787 (to Schmidt et al.) and 4,546,160 (to Brand et al.).

Alternatively, the low-Tg and high-Tg acrylic copolymers of the present invention can also be manufactured via conventional so-called "solution" polymerization processes. One example of such a process is set forth in a paper titled "High Solids Acrylic Coatings: Resin Synthesis With t-Amyl Peroxides", by Vasanth R. Kamath and James D. Sergent Jr., of Penwalt Corporation, presented at the "Water-Borne and Higher-Solids Coating Symposium", Feb. 5-7, 1986.

One preferred low-Tg acrylic copolymer comprises about 25% to about 40% by weight of hydroxyethyl acrylate, about 15% to about 35% by weight butyl acrylate, about 20% to about 50% by weight methyl methacrylate, and about 0% to about 20% by weight styrene. A more preferred low-Tg acrylic copolymer comprises about 27% to about 31% by weight hydroxyethyl acrylate, about 22% to about 26% by weight butyl acrylate, about 35% to about 39% by weight methyl methacrylate, and about 9% to about 11% by weight styrene. These preferred low-Tg acrylic copolymers must have a hydroxyl number of about 112 to about 187 (still more preferably about 125 to about 160), a number-average molecular weight in the range of about 1500 to about 4000, a polydispersity value of no more than about 3, and a glass-transition temperature in the range of about $-10°$ to about $+20°$ C. (more preferably about $0°$ C. to about $+20°$ C.).

A preferred high-Tg acrylic copolymer comprises about 10% to about 24% by weight hydroxyethyl acrylate, about 30% to about 60% by weight methyl methacrylate, about 10% to about 20% by weight butyl acrylate, and about 0% to about 20% by weight styrene. A more preferred high-Tg acrylic copolymer comprises about 13% to about 17% by weight hydroxyethyl acrylate, about 48% to 52% by weight methyl methacrylate, about 14% to about 18% by weight butyl acrylate, and about 18% to about 22% by weight styrene. These preferred high-Tg acrylic copolymers must have a hydroxyl number of about 35 to about 112 (still more preferably about 47 to about 80), a number-average molecular weight in the range of about 2500 to about 4500, a polydispersity value of no more than about 3.5, and a glass transition temperature in the range of about $+25°$ C. to about $+110°$ C. (still more preferably about $+25°$ to about $+50°$ C.).

After preparation of each of the low-Tg and high-Tg acrylic copolymers, and after cutting each copolymer (in a suitable solvent) to its desired solids level, the copolymers are physically blended together with agitation and heat sufficient to enhance mixing but below the boiling temperature of the solvent.

In the polyol blend, each of the low-Tg and high-Tg acrylic copolymers is present in an amount of about 5 wt.-% to about 95 wt.-%, preferably about 14 wt.-% to about 86 wt.-%, more preferably 30 wt.-% to about 70 wt.-%, based on total weight of the polyol blend. These ranges will, of course, be dictated by the hydroxyl number of each copolymer, the required solids level in the final coating compositions, and economic as well as performance concerns. The relative amounts of low-Tg copolymer to high-Tg copolymer in the polyol blend will also vary as a result of the particular cross-linking agent that is used and the particular type of coating composition that is desired.

Clear or pigmented coating compositions can be manufactured by mixing polyol blends of the invention with suitable cross-linking agents to provide high solids, low viscosity coatings.

As stated above, the solvent content of coating compositions is defined in terms of the amount of the Volatile Organic Compounds (VOCs) that are present in the coating composition. VOC is measured in either pounds per gallon or grams per liter. Throughout the art, it is generally agreed that the most accurate (or reliable) manner of defining solvent content is in terms of VOC values.

Using this definition, coating compositions in accordance with the principles of the present invention and comprising polyol blends of low-Tg and high-Tg acrylic copolymers and suitable cross-linking agents will have a solvent content of about 2.0 to about 4.2 pounds per gallon (of polyol blend and crosslinking agent in solvent), and more preferably in the range of about 2.6 to about 3.5 pounds per gallon.

When calculating the actual weight percent solids in any coating composition, such calculation must take into account whether the coating composition is clear or pigmented because pigments must be treated as "solids" in the calculation. Additionally, factors such as density of the solvents used, density of the polyol blends used, as well as certain other factors, must be taken into consideration when determining the actual percentage solids in the coating compositions. Generally, taking the above factors into consideration, the weight percent of solids of coating compositions using the polyol blends of the invention mixed with suitable cross-linking agents will be in the range of about 46% to about 87% solids, preferably in the range of about 57% to about 85%, and more preferably in the range of about 65% to about 81% solids.

The polyol blends of the invention are mixed with suitable cross-linking agents to provide the desired coating compositions. Typical cross-linking agents useful with the polyol blends include polyisocyanates and amino (e.g., so-called "aminoplast" type) resins.

Polyisocyanates useful as cross-linking agents include aliphatic polyisocyanates, cycloaliphatic polyisocyanates, aromatic isocyanates, and mixtures thereof. Suitable aromatic isocyanates include, but are not limited to, adducts of toluene diisocyanate, isophonone diisocyanate, tetramethyl xylene diisocyanate, and the like. Preferred polyisocyanates include the biurets of hexamethylene diisocyanate and isocyanurate of hexamethylene diisocyanate.

The amount of polyisocyanate cross-linking agent used is based on the ratio of isocyanate groups to hydroxyl groups, in the coating composition. Typical in the coating industry, the weight percentages of polyol blend to polyisocyanate cross-linking agent is so chosen such that there are between about 0.8:1 and about 1.3:1 isocyanate groups per hydroxyl group of the polyol blend. A preferred ratio of isocyanate groups per hydroxyl group is about 0.9:1 to about 1.2:1.

Based upon the above ratios, the weight percentages of polyol blend and polyisocyanate can generally be calculated, on a solids basis, so as to provide, in the ultimate coating composition, about 10% to about 42% polyisocyanate and about 58% to about 90% polyol blend. A more preferred range is from about 16% to about 40% polyisocyanate to about 84% to about 60% polyol blend. These ranges are calculated using the equivalent weight of the final polyol blend, which is in the range of about 350 to about 1200, and preferably 350 to 800, and the equivalent weight range of the polyisocyanate which is generally in the range of about 181 to about 195 on a solids basis. These percentages will of course vary depending upon the relative value of the equivalent weight of the particular polyisocyanate that is used.

While the preferred cross-linking agents are the polyisocyanates, other cross-linking agents may effectively be utilized in conjunction with the polyol blends of the present invention. For example, conventional amino resin cross-linking agents are useful with the polyol blends to prepare coatings.

Suitable amino resin cross-linking agents include the glycouril formaldehydes, the urea formaldehydes, the melamine formaldehydes, the benzoguamine formaldehydes, and the like. The melamine formaldehydes include the partially-alkylated and the fully-alkylated melamine formaldehyde resins. Preferred amino resins are the alkylated melamine formaldehydes mentioned immediately above.

Generally, based upon the above considerations, the relative weight percentages, in the ultimate coating compositions, of the amino resin cross-linking agent to the acrylic polyol blend is about 7% to about 40% amino resin cross-linking agent to about 60% to about 93% acrylic polyol blend, and preferably about 10% to about 34% amino resin cross-linking agent to about 66% to about 90% acrylic polyol blend.

In the manufacture of the polyol blend/cross-linking agent coating compositions of the present invention, additional known constituents may also be used. For example, the coating compositions may include conventional inorganic and/or organic pigments such as titanium dioxide, carbon black, phthalocyanide blue, and the like; solvents such as acetates, alcohols, aromatics, esters, ethers, ketone, and the like; catalysts such as para-toluene sulphonic acid, and the like; catalytic metal complexes (e.g., dibutyl tin dilaurate, zinc octoate); amine compounds (e.g., triethylene diamine); as well as other "additives" type ingredients, such as defoamers, surface-tension modifiers, surfactants, dispersant, thickeners, and the like.

Clear coating compositions are prepared from the polyol blend/cross-linking agent ingredients by conventional methods of manufacture known in the art. For example, a solvent solution of low-Tg acrylic copolymer is blended with a solvent solution of high-Tg acrylic copolymer to give a polyol blend solvent solution having an equivalent weight based on resin solids which is appropriate for a particular coating application, as desired. Solvent can, for example, be added to the polyol blend solution to bring the solution to a desired viscosity and solids level.

A suitable polyisocyanate cross-linking agent is weighed out separately to yield a ratio of isocyanate group to hydroxyl group of about 0.8:1 to about 1.3:1. A suitable catalyst is weighed out in a suitable solvent and added to the polyol blend solution. A suitable solvent is one that is able to dissolve both the particular catalyst as well as the particular low-Tg and high-Tg acrylic copolymers that are selected. The catalyst-containing polyol blend solution is physically mixed with the polyisocyanate to yield a catalyzed polyisocyanate polyol blend solution. Such solution is then used to coat the desired substrate. The coating composition is applied by conventional industrial coating methods such as spray, dip, roll, brush, and the like.

Pigmented coating compositions are also prepared by conventional methods of manufacture. For example, a three-step process for preparing a pigmented coating composition can be used. One such three-step process can be illustrated by the following.

First, a pigmented paste, either of one of the low-Tg or high-Tg acrylic copolymers (alone), or of the polyol blend, is prepared by mixing the pigment with the copolymer or polyol blend at a pigment-to-binder weight ratio of about 1:1 to about 5:1, to provide a grind. The term "grind" as used herein, and as used by others in the art, is understood to mean pigment dispersion. The quality of the grind is checked with a conventional grind gauge until the degree of pigment dispersion is suitable for the intended application or end-use. The term "binder" as used herein is understood to mean the single acrylic copolymer or the polyol blend, whichever is utilized.

Second, the paste is then added to a first package or container. Such container or package contains all of the remainder of the coating ingredients except the polyisocyanate cross-linking agent or ingredient. Typically, the pigmented paste is mixed with an appropriate level of polyol blend, solvent, additives (if desired), and catalysts, to yield a desired pigmented-coating ingredient-containing combination, which does not yet contain the cross-linking agent. Thereafter, the combination (still not containing the cross-linking agent) is mixed until uniform, utilizing standard paint-making equipment.

Third, the polyisocyanate cross-linking agent is added to a second package or container at a level sufficient to yield an isocyanate group to hydroxyl group equivalent-weight ratio of about 0.8/1.0 to about 1.3/1.0 in the final coating. As used herein, the hydroxyl group equivalent weight is determined by dividing the number 56,104 by the hydroxyl number; and the isocyanate group equivalent weight is determined by dividing the number 4,200 by the wt.-% -NCO (i.e., isocyanate) moiety that is present in the isocyanate moiety-bearing agent or ingredient.

Just prior to use, the first package (i.e., the polyol blend) and the contents of the second package (i.e., the polyisocyanate) are physically mixed, and thereafter shaken until uniform, typically utilizing conventional equipment. The resultant pigmented paint is then ready for immediate use, and can be applied to the desired substrate utilizing conventional coating methods.

The above-described formulation procedures provide clear and pigmented coating compositions having high solids, low viscosity and extended pot-life; and additionally provide a coating with a hard finish, and good gloss retention as well.

The following examples are set forth to illustrate more clearly the principles and practice of the present invention, particularly to one skilled in the art. As such, the following examples are not intended to limit the invention but are merely illustrative of certain preferred embodiments.

In the following examples, all parts and percentages are on a weight basis unless otherwise indicated.

BRIEF DESCRIPTION OF THE DRAWINGS

The drawings comprise a graph and scans from the following examples. Specifically, FIGS. 2 and 3 are Differential Scanning Calorimeter (DSC) scans, resulting from the DSC analysis of certain other examples.

EXAMPLES 1-3

Figure 1:
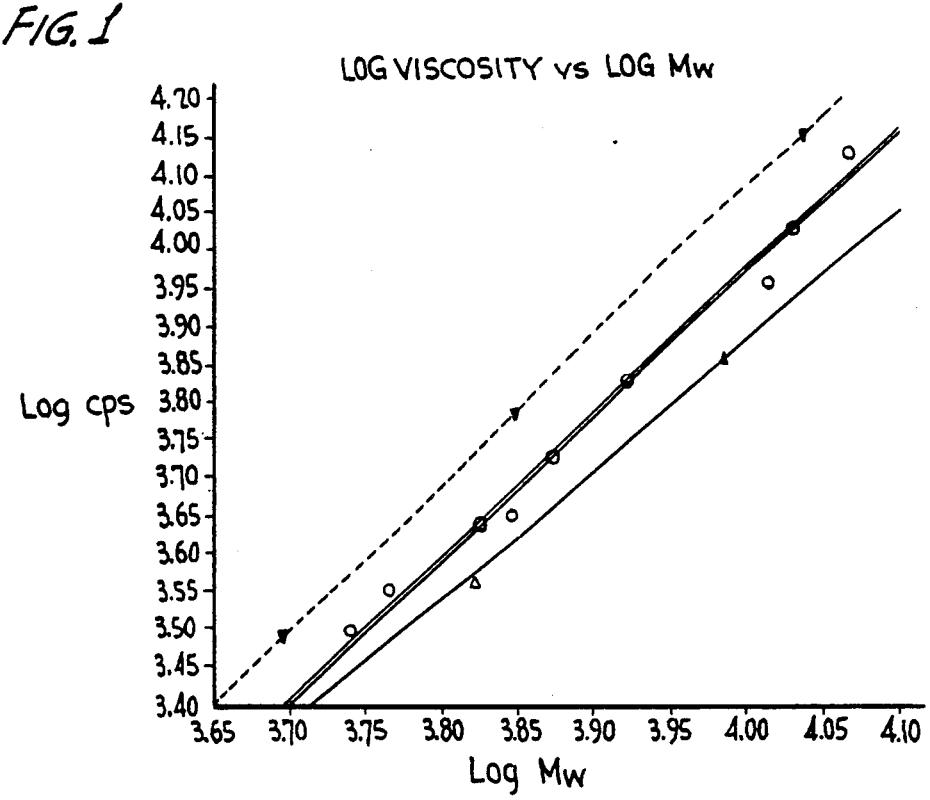
FIG. 1 is a graph plotting the log (to the base 10) of the viscosity value (as measured in centipoise) versus the log (to the base 10) of the weight-average molecular weight of certain examples.

Examples 1 and 2 (illustrative of low-Tg acrylic copolymers) and Example 3 (illustrative of a high-Tg acrylic copolymer) were prepared as follows:

The low-Tg and high-Tg acrylic copolymers of Examples 1-3 were each prepared, in accordance with the below-summarized methods, by first preparing a mixture of the below-stated monomers, initiator, and solvent, thereby producing a mixture for each example, and thereafter charging the resultant mixture into a continuous mixed reaction zone (for each such mixture) at the specified temperatures and for the specified residence time, as set forth below. Thereafter, the reaction mixtures were introduced into a conventional separator, for separating each thus-produced acrylic copolymer from its volatile components. Each such reaction mixture included volatile components, unreacted monomers, acrylic copolymer product, and a variety of by-products. In the conventional separator, the volatile components, including the unreacted monomers and by-products, were evaporated; and the polymer products were recovered. The low Tg acrylic polymers of Examples 1 and 2 and the high Tg acrylic copolymer of Example 3 were each then cut with an amount of methyl n-amyl ketone (MAK) solvent, to a solids level sufficient to achieve desired fluidity. (Fluidity is a term that is utilized to indicate how readily a substance flows.) Desired fluidity will, of course, be dependent upon a particular application or end-use. Thereafter, 52.4%, on a solids basis, of the high-Tg acrylic copolymer of Example 3 and 47.6% of the low-Tg acrylic copolymer of Example 1 were physically blended with agitation and heat (i.e., about 50° C. to about 100° C.), sufficient to enhance the mixing but below the boiling point of the methyl n-amyl ketone (i.e. 150.6° C.).

The polyol blend of Examples 1 and 3 produced a compatible polyol blend having a Tg of 22.2° C., a Mn of 2680, and a Mw of 7200.

51.8%, on a solids basis, of the high-Tg acrylic copolymer of Example 3 and 48.2%, on a solids basis, of the low Tg acrylic polymer of Example 2 were physically blended with agitation and heat (i.e., about 50° C. to about 100° C.).

The polyol blend of Examples 2 and 3 produced a compatible polyol blend having a Tg of 23.4° C., a Mn of 3140, and a Mw of 9580.

These polyol blends, when mixed with a polyisocyanate cross-linking agent, provided film-forming compositions. Such compositions, which when applied as air-dryable coatings, had excellent film characteristics.

TABLE I

| Summary of Methods of Preparing Examples 1-3 | | | |
|---|---|---|---|
| | Example 1 | Example 2 | Example 3 |
| Monomer Ingredients (parts by weight) | | | |
| Styrene | 7.96 | 7.96 | 19.2 |
| Methyl methacrylate | 29.44 | 29.44 | 50.5 |
| Butyl acrylate | 19.10 | 19.10 | 16 |
| Hydroxyethyl acrylate | 23.08 | 23.08 | 14.3 |
| Initiator | | | |
| Di-tertiary butyl peroxide | 0.42 | 0.42 | 0.44 |
| Solvent | | | |
| Methyl n-amyl ketone | 20.00 | 20.00 | 20.00 |
| Reaction Conditions | | | |
| Reactor Residence Time | 12 Mins. | 12 Mins. | 12 Mins. |
| Reactor Temperature | 218° C. | 196° C. | 202° C. |
| Characteristics of the Acrylic Copolymer Produced | | | |
| Hydroxyl Number | 140 | 140 | 70 |
| Weight-Average Molecular Weight | 4280 | 10220 | 7620 |
| Number-Average Molecular Weight | 2030 | 3510 | 3030 |
| Polydispersity (Mw/Mn) | 2.2 | 3 | 2.5 |

EXAMPLES 4-6

CLEAR COATINGS OF POLYOL BLENDS COMPARED WITH CLEAR COATINGS WITH STAND-ALONE COPOLYMERS

For comparison purposes, two coating compositions were made using the two polyol blends of Examples 4 and 5 of the invention; and two clear coating compositions were made using stand-alone acrylic copolymers of comparative Examples A and B. Each of the acrylic copolymers for the polyol blends and the stand-alone acrylic copolymers was prepared by the method described above in connection with Examples 1-3. The polyol blends and the stand-alone acrylic copolymers were prepared using the following constituents and had the following characteristics:

TABLE II

Summary of Methods of Preparing Polyol Blends of Examples 4 & 5

|  | Example 4 | Example 5 |
|---|---|---|
| Low-Tg Acrylic Copolymers | | |
| Weight % Used | 47.6% | 48.2% |
| Monomers | | |
| Styrene | 10.00 | 10.00 |
| Methyl methacrylate | 37.00 | 37.00 |
| Butyl acrylate | 24.00 | 24.00 |
| Hydroxyethyl acrylate | 29.00 | 29.00 |
| Initiator | | |
| Di-tertiary butyl peroxide | .53 | .53 |
| Solvent | | |
| Methyl amyl ketone | 25.13 | 25.13 |
| Conditions | | |
| Reactor Residence Time | 12 to 15 minutes | — |
| Characteristics of Low-Tg Acrylic Copolymers Thus Produced | | |
| Weight-Average Molecular Weight | 6460 | 6466 |
| Number-Average Molecular Weight | 2750 | 2750 |
| Polydispersity | 2.35 | 2.35 |
| Tg | 12° C. | 12° C. |

TABLE III

Summary of Methods of Preparing High-Tg Acrylic Copolymer

|  | Example 4 | Example 5 |
|---|---|---|
| High-Tg Acrylic Copolymer | | |
| Weight % Used | 52.4 | 51.8 |
| Monomers | | |
| Styrene | 25.00 | 25.00 |
| Methyl methacrylate | 47.00 | 47.00 |
| Butyl acrylate | 14.00 | 14.00 |
| Hydroxyethyl acrylate | 14.00 | 14.00 |
| Initiator | | |
| Di-tertiary butyl peroxide | .55 | .55 |
| Solvent | | |
| Methyl amyl ketone | 25.14 | 25.14 |
| Conditions | | |
| Reactor Residence Time | 12-15 minutes | — |
| Characteristics of High-Tg Acrylic Copolymers Thus Produced | | |
| Weight-Average Molecular-Weight | 7520 | 12260 |
| Number-Average Molecular Weight | 2650 | 3800 |
| Polydispersity | 2.83 | 3.22 |
| Tg | 28° C. | 47° C. |

TABLE IV

Summary of Methods of Preparing Stand-Alone Acrylic Copolymers of Examples A and B

|  | Example A | Example B |
|---|---|---|
| Monomers | | |
| Styrene | 21.00 | 21.00 |
| Methyl methacrylate | 47.00 | 47.00 |
| Butyl acrylate | 15.00 | 15.00 |
| Hydroxyethyl acrylate | 18.00 | 18.00 |
| Initiator | | |
| Di-tertiary butyl peroxide | .42 | .42 |
| Solvent | | |
| Methyl amyl ketone | 25.10 | 25.10 |
| Conditions | | |
| Reactor Residence Time | 15 minutes | — |
| Characteristics of Polymers | | |
| Weight-Average Molecular Weight | 6870 | 11130 |
| Number-Average Molecular Weight | 2650 | 3700 |
| Polydispersity | 2.6 | 3 |
| Tg | 21° C. | 27° C. |

Each of the polyol blends of Examples 4 and 5 and the stand-alone copolymers of Examples A and B was prepared as a 70% solids solutions in methyl n-amyl ketone (MAK). 64.52 grams of each of the 70% solids polyol solutions of Examples 4 and 5 and Examples A and B was mixed with 0.6 grams of a 10% solution of a commercially available flow additive (Dow-Corning DC 57 generically referred to in the art as a silicone oil, principally utilized as a paint additive, sold by Dow-Corning Corporation, Midland, Mich.), in MAK and 3.0 grams of a 0.1% solution of dibutyl tin dilaurate catalyst in MAK. To each of these solutions, 14.78 grams of, a commercially-available biuret of hexamethylene diisocyanate (i.e., Desmodure N-3200), was added. Each of the resultant clear coatings for the polyol blends of Examples 4 and 5, and the stand-alone copolymers of Examples A and B, were drawn down on commercially-available cold-rolled steel panels (i.e., Bonderite 1000 panels); and tack-free time as well as hardness values of the coatings were measured. Viscosity of the initial solutions as well as the time to double in viscosity were also measured using a Brookfield viscometer. The results are as follows:

TABLE V

Properties of Coatings Made From Noted Examples

| Clear Coating Sample | Tg | Mw | Visc. (cps.) | Hrs. to Double Visc. | Hardness (7 days dry) Konig | Hardness (7 days dry) Pencil | Zapon Tack-Free Time (hr) |
|---|---|---|---|---|---|---|---|
| Ex. 4 | 22 | 7200 | 218 | 3.5 | 117 | H | 14.5 |
| A | 21 | 6870 | 250 | 3.6 | 115 | H | 18.8 |
| Ex. 5 | 23 | 9580 | 290 | 3.1 | 123 | H | 11.5 |
| B | 27 | 11,130 | 392 | 2.5 | 121 | H | 18.7 |

Konig hardness values were determined in accordance with the procedures of ASTM D 4366-84, Method "A" (Konig Pendulum Hardness). Pencil hardness values were determined in accordance with the procedures of ASTM D 3363-74, Section 7.1 (Gouge Hardness). Zapon hardness values were determined in accordance with the procedures of ASTM D 1640-83, Sections 7.3.3 and 7.3.3.1.

These results illustrate that the polyol blends of the invention can provide clear acrylic urethane coatings with comparable hardness, comparable or better pot-life, and much improved tack-free time at a lower applied viscosity than the stand-alone acrylic copolymers.

PIGMENTED COATINGS WITH POLYOL BLENDS COMPARED WITH PIGMENTED COATINGS WITH STAND-ALONE COPOLYMERS

Pigmented coating compositions were compared using the polyol blends of Examples 4 and 5 above to prepare such coating compositions, and an additional polyol blend of Example 6 was prepared from 47.1 weight percent of a low-Tg copolymer of the same monomer composition as the low-Tg copolymer of the polyol blend of Example 4 but having an average number molecular weight of 2050, a molecular weight of 4310, a polydispersity value of 2.1 and a Tg of 5° C. The polyol blend of Example 6 further included 52.9 weight percent of the high-Tg copolymer of the polyol blend of Example 4. The polyol blends of Examples 4, 5, and 6 and stand-alone copolymers of Examples A and B were made into white paints.

Accordingly, titanium dioxide pigment was dispersed in a methyl n-amyl ketone (MAK) solution of each of the polyol blends of Examples 4, 5, and 6, and the stand-alone copolymers of Examples A and B on a Cowles mixer at 2000 to 2500 rpm for 20 to 25 minutes. The paste temperature was allowed to climb to between about 48° C. and 78° C. during the grinding procedure. Sufficient solvent was added after the pigment-grinding step to account for any solvent lost on grinding. Enough pigment was used to yield a 1/1 pigment to binder ratio in the final coating. Grinds were run such that the pastes passed a 0 micron grind-cleanliness standard. Sufficient additional polyol and solvent were added to the pastes to bring the polyol content of the mixture to a total solids weight of 191.2 grams. To this was added 3.66 grams of a 0.1% solution of dibutyl tin dilaurate catalyst in methyl n-amyl ketone and 2.56 grams of a 28/72 parts-by-weight ratio of a commercially-available polyether-modified methyl alkyl polysiloxane (known as "BYK-320", and sold by BYK Chemie)/MAK solution, as a silicone. The BYK/MAK solution was thus utilized as a silicone-based surface modifier.

68.8 grams of a commercially-available biuret of hexamethylene diisocyanate (Desmodure N-3200), was added to this mixture. The total amount of methyl n-amyl ketone that was used in the composition was such that the total solids equaled 76 weight percent, or about 2.8 lbs/gallon (VOC).

Paints based on the polyol blends of Examples 4, 5, and 6 were compared in viscosity, pot-life, hardness, and an accelerated weather-performance test (i.e., QUV), to paints based on stand-alone copolymers A and B. The QUV weather-performance test was conducted in accordance with the procedures of ASTM G 53-84, wherein the conditions were 4 hours UV at 50° C. (utilizing a UVB-313 bulb) and 4 hours of condensation at 40° C.

The coating compositions themselves were measured with a Brookfield viscometer to determine viscosity and pot-life. Coatings drawn down on a commercially-available cold-rolled 24-gauge steel panel (Bonderite 1000 panel), and air dried under ambient conditions for 24 days, were utilized for purposes of comparing hardness and QUV values. The results are as follows:

TABLE VI

| Paint Sample | Performance of Coatings | | | | | |
|---|---|---|---|---|---|---|
| | Tg | Mw | Visc. (cps.) | Hrs to Double Visc. | Hardness (24 days air dry) | | |
| | | | | | Konig | Tukon | Pencil |
| Ex. 6 | 22 | 6330 | 406 | 4.8 | 108 | 19.7 | 2H |
| Ex. 4 | 22 | 7200 | 516 | 4.8 | 112 | 20.2 | 2H |
| Ex. A | 21 | 6870 | 545 | 4.7 | 106 | 20.0 | 2H |
| Ex. 5 | 23 | 9580 | 814 | 4.5 | 113 | 20.8 | 2H |
| Ex. B | 27 | 11,130 | 1043 | 4.3 | 112 | 20.3 | 2H |

Tukon hardness values were determined in accordance with the procedures of ASTM D 1474-68, Method "A" (Knoop Indentation Hardness).

These results illustrate that the polyol blends of the invention have comparable or better pot-life and hardness values than the stand-alone copolymers at lower applied viscosities. Additionally, as shown below, gloss retention, particularly as is indicated in the herein-identified accelerated weather-performance test (i.e., QUV) is also comparable:

TABLE VII

| Paint/ Sample | Gloss Retention In White Acrylic Urethanes | | | | |
|---|---|---|---|---|---|
| | 60 degree Gloss As Function of Exposure in Hours | | | | |
| | Initial | 233 hrs. | 497 hrs. | 833 hrs. | 1024 hrs. |
| Ex. 6 | 91 | 88 | 84 | 81 | 80 |
| Ex. 4 | 91 | 88 | 85 | 82 | 81 |
| Ex. A | 90 | 87 | 85 | 83 | 81 |
| Ex. 5 | 87 | 85 | 83 | 83 | 84 |
| Ex. B | 87 | 85 | 84 | 83 | 84 |

EXAMPLE 7

Comparative Example of Acrylic Polygol Blend With The Individual Acrylic Copolymers Coatings made with polyol blends of the invention have better QUV gloss retention than coatings made with the individual copolymers of the blends, as is seen from Table VIII. In Table VIII, the low-Tg copolymer used above in the polyol blend of Example 4, is referred to in Table III as Example C, and the high-Tg copolymer used above in the polyol blend of Example 4, is referred to in Table VIII as Example D. Examples C and D were compared with the polyol blend of Example 7. The polyol blend of Example 7 comprises 61.3% of Example C and 38.7% of Example D. White paints were prepared with these stand-alone copolymers, Examples C and D, and the polyol blend of Example 7. Such white paint comparative formulations had a 1/1 pigment to binder ratio, and a 1.1/1 isocyanate group to hydroxyl group ratio. The following QUV results are obtained:

TABLE VIII

| Polyol/ Paint | Gloss Retention Results for Blends Versus Components | | | | | | |
|---|---|---|---|---|---|---|---|
| | 60 degree Gloss Retention as a Function of Hours | | | | | | |
| | Initial | 185 | 448 | 911 | 1311 | 1760 | 2096 |
| Ex. C | 90 | 87 | 81 | 63 | 55 | 49 | 42 |
| Ex. D | 89 | 87 | 81 | 64 | 51 | 35 | 18 |
| Ex. 7 | 91 | 89 | 83 | 71 | 64 | 58 | 47 |

60 degree gloss-retention values were determined utilizing a commercially-available glossmeter (i.e., a BYK Chemie glossmeter) oriented at 60 degrees from a line perpendicular to the gloss-coated substrate.

These comparative test results illustrate that the polyol blends are superior to the stand-alone copolymers in coating compositions as the polyol blend improves accelerated weathering performance.

EXAMPLE 8

Comparative Example of Polyol Blend of the Invention With Polyol Blend Outside the Range of the Invention The following is a comparative example of a polyol blend of the invention, Example 8, with a polyol blend of a low Tg copolymer having a number-average molecular weight outside the range of the polyol blends of the invention.

Specifically, the comparative polyol blend, Example E, comprised 56.3 weight percent of a low-Tg copolymer of 20% methyl methacrylate, 15% styrene, 30% butyl acrylate, and 35% hydroxyethyl methacrylate. The low-Tg copolymer had a Tg of 2° C., a Mn of 1300, a Mw of 2250, a polydispersity of 1.7, and a hydroxyl number of 147. The comparative polyol blend included 43.7 weight percent of a high-Tg copolymer of 58% methyl methacrylate, 15% styrene, 15% butyl acrylate, 10% hydroxyethyl methacrylate, 2% acrylic acid. Such a high-Tg copolymer had of 50° C., a Mn of 4000, a Mw of 10,500, a polydispersity value of 2.6, and a hydroxyl number of 45. These low-Tg and high-Tg copolymers were blended together to produce comparative Example E. The polyol blend of Example E had an equivalent weight of 570.

For comparison, the polyol blend of Example 8, within the scope of the invention, was prepared from 55.6% of a low Tg copolymer comprising 37% methyl methacrylate, 10% styrene, 29% butyl acrylate, 29% hydroxyethyl acrylate. Such a low-Tg copolymer had a Tg of +8° C., a Mn of 2030, a Mw of 4280, and a polydispersity value of 2.1. The polyol blend of Example 8 included 44.4% of the same high-Tg copolymer as is described above for Example E. The polyol blend of Example 8 was also so prepared as to yield an equivalent weight of about 570.

White coatings were made from the polyol blends of Example 8 and comparative Example E, as set forth above. The QUV gloss retention values of these white paints were measured, with the results as set forth as follows:

TABLE IX

QUV Gloss Retention As Function of Mn of Low Tg Copolymer

| Polyol/ Paint | 60 Deg. Gloss Retention As Function Of Hours Of Exposure | | | | | | | | | | |
|---|---|---|---|---|---|---|---|---|---|---|---|
| | 0 | 231 | 442 | 644 | 825 | 1030 | 1153 | 1338 | 1473 | 1639 | 1798 |
| Ex. 8 | 88 | 86 | 84 | 81 | 77 | 75 | 75 | 67 | 61 | 49 | 39 |
| Ex. E | 89 | 85 | 82 | 82 | 73 | 72 | 73 | 58 | 49 | 39 | 31 |

As seen from the above results, the polyol blend of the invention provides superior results over extended periods of time, over other polyol blends.

EXAMPLES 9-22

COMPARATIVE EXAMPLES BETWEEN POLYOL BLEND AND STAND-ALONE COPOLYMERS FOR POLYOL VISCOSITY AND COPOLYMER COMPATIBILITY

As previously stated, superior results are obtained using the acrylic polyol blends of the invention over stand-alone acrylic copolymers. The term "stand-alone" acrylic polyol copolymer, as used herein is understood to mean an acrylic polyol copolymer produced, not as a blend, but as a single acrylic polyol copolymer.

Two factors, believed to be key to providing superior results to the polyol blends of the present invention, are (1) that the blends have lower viscosities than stand-alone acrylic copolymers having the same overall composition, Tg and molecular weight; and (2) that the blends, in spite of their having different compositions (due to their different monomer demands to meet the Tg and hydroxyl requirements), are compatible blends.

As was mentioned above, it is very important to be able to produce a relatively lower viscosity acrylic copolymer when it is desirable to use such in a high-gloss paint formulation.

Compatability, as between the low-Tg and high-Tg acrylic copolymers of the polyol blend of the present invention, is desirable for another reason. For example, if the copolymers were not compatible, desirable high-gloss values would generally not be achievable. If incompatability were severe enough, the phases of the coating composition might separate, which is undesirable.

In order to illustrate the lower viscosity achieved by use of the polyol blends of the invention over stand-alone copolymers, the log (to the base 10) of the viscosity, in centipose, as a function of the log (to the base 10) of the weight-average molecular weight was compared between polyol blends of the invention and certain stand-alone copolymers. The results are shown in Table XII (below) and FIG. 1. Specifically, polyol blends and the stand-alone acrylic copolymers were prepared having the following monomer compositions and characteristics:

TABLE X

Summary of Several Copolymers, Their Compositions and Properties

| Copolymer | Composition (Parts by Weight) | Tg (°C.) | Mn | Mw | Equiv. Weight (100% Sol.) |
|---|---|---|---|---|---|
| Low-Tg Copolymers | | | | | |
| I | 10 S/37 MMA/24 BA/29 HEA | 5 | 1650 | 3180 | 422 |
| II | 10 S/37 MMA/24 BA/29 HEA | 5 | 2050 | 4310 | 396 |
| III | 10 S/37 MMA/24 BA/29 HEA | 12 | 2750 | 6460 | 399 |
| IV | 10 S/37 MMA/24 BA/29 HEA | 17 | 3680 | 10,510 | 397 |
| High Tg Copolymers | | | | | |
| VI | 25 S/47 MMA/14 BA/14 HEA | 30 | 2330 | 5310 | 814 |
| VII | 25 S/47 MMA/14 BA/14 HEA | 28 | 2650 | 3800 | 840 |
| VIII | 25 S/47 MMA/14 BA/14 HEA | 46 | 3800 | 12,260 | 850 |
| Stand Alone Copolymers | | | | | |
| F | 21 S/47 MMA/15 BA/18 HEA | 23 | 2000 | 4950 | 650 |
| G | 21 S/47 MMA/15 BA/18 HEA | 24 | 2620 | 7060 | 650 |
| H | 21 S/47 MMA/15 BA/18 HEA | 23 | 3580 | 10,870 | 650 |

TABLE X-continued

Summary of Several Copolymers, Their Compositions and Properties

| Copolymer | Composition (Parts by Weight) | Tg (°C.) | Mn | Mw | Equiv. Weight (100% Sol.) |
|---|---|---|---|---|---|
| | BA/18 HEA | | | | |

S = Styrene
MMA = Methyl Methacrylate
BA = Butyl Acrylate
HEA = Hydroxyethyl Acrylate Each of the stand-alone copolymers, Examples F, G and H, has an equivalent weight of 650, at 100% solids. Each was dissolved in methyl n-amyl ketone, to 70 wt.-% solids, to determine viscosity. Each is represented by the downwardly-pointing, filled triangles shown in FIG. 1.

Nine polyol blends of low-Tg and high-Tg acrylic copolymer, namely Examples 10-12, 14-16, and 18-20, each having an equivalent weight of 650 at 100% solids, were prepared. Each was dissolved in methyl n-amyl ketone, to 70 wt.-% solids, to determine viscosity. Each was prepared from the low-Tg copolymers, identified in Table X as low-Tg copolymers II, III, and IV and high-Tg copolymers, identified in Table X as high-Tg copolymers VI, VII, and VIII. Examples 10-12, 14-16 and 18-20 are represented by the open circles in FIG. 1.

Figure 2:
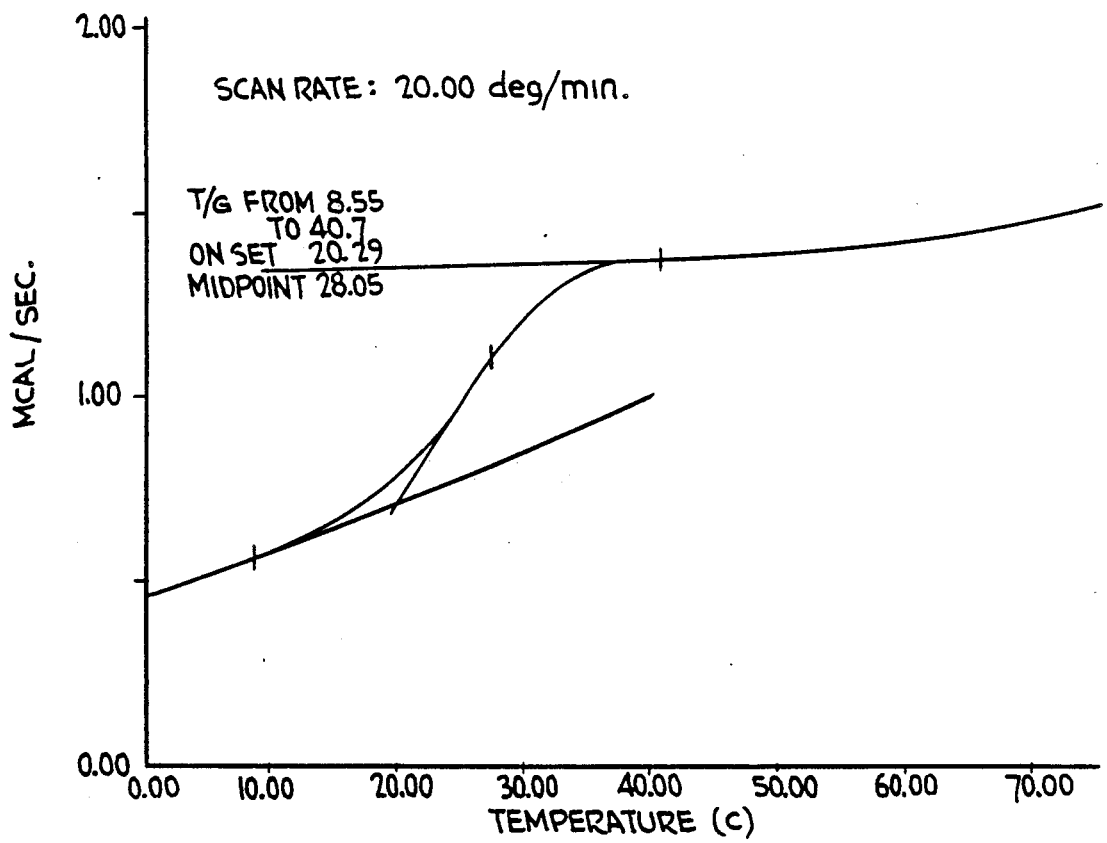

The polyol blends were prepared so as to have a blend equivalent weight of 650, to match the stand-alone copolymer samples. All of the polyol blends of the present invention, as set forth in Table XI (below), were compatible. In particular, the single Tg shown in each of FIGS. 2 and 3 is evidence of compatability. If the low-Tg and high-Tg acrylic copolymers were not compatable, two glass-transition temperatures would result instead of what is shown in FIGS. 2 and 3.

The fact that the log viscosity as a function of log Mw line for the blends of Examples 10-12, 14-16 and 18-20 falls below the log viscosity/log Mw line for the three stand-alone acrylic copolymers, Examples F, G, and H, indicates in FIG. 1 that the polyol blends of the invention have lower viscosity, and that the lower viscosity of the blends cannot be explained solely as a function of molecular weight. Based on the fact that the monomer compositions of the polyol blends and the stand alone acrylic copolymers are nearly identical, and the Tg values are very close, it is currently believed that the lower viscosity of the blends is due to the use of a blend of the low Tg, high hydroxyl number acrylic copolymer with the high Tg, low hydroxyl number acrylic copolymer in the defined ranges of hydroxyl numbers, number average molecular weights, polydispersities, and gloss retention temperatures, as set forth herein.

Also presented in FIG. 1, and shown by the upwardly-pointing open triangles, are the viscosity result for the polyol blends of Examples 9, 13 and 17, using a lower molecular weight, lower Tg copolymer, namely that which is identified in Table X as low-Tg copolymer "I". The low Tg copolymer, "I", which has a Tg of 5° C., an equivalent weight of 422, and a number average molecular weight of 1650, was blended with the three high-Tg copolymers, namely those identified in Table X as high-Tg copolymers "VI", "VII", and "VIII". The result of blending such low-Tg and high-Tg acrylic copolymers provided the polyol blends of Examples 9, 13 and 17. Examples 9, 13 and 17 each had relatively low viscosity, as is shown by the open triangles in FIG. 1.

TABLE XI

Low-Tg, High-Tg Blend Formulations

| Example No. | Low-Tg/High-Tg | Parts By Weight |
|---|---|---|
| 9 | I/VI | 27.22/72.78 |
| 10 | II/VI | 23.95/76.05 |
| 11 | III/VI | 24.23/75.77 |
| 12 | IV/VI | 24.02/75.98 |
| 13 | I/VII | 29.53/70.47 |
| 14 | II/VII | 26.09/73.91 |
| 15 | III/VII | 26.38/73.26 |
| 16 | IV/VII | 26.16/73.84 |
| 17 | I/VIII | 30.37/69.63 |
| 18 | II/VIII | 26.87/73.13 |
| 19 | III/VIII | 27.16/72.84 |
| 20 | IV/VIII | 26.95/73.05 |

Table XI presents the parts-by-weight formulations of the blends of Examples 9-20. For example, 27.22 parts by weight of a low Tg acrylic copolymer (identified immediately above and in Table X as Low Tg Copolymer "I") were combined with 72.78 parts by weight of a high Tg acrylic copolymer (identified immediately above and in Table X as High Tg Copolymer "VI").

The equivalent weight of each of Examples 9-20 as well as stand-alone polyols of each of Examples F, G and H, was about 650, at 100 wt.-% solids.

TABLE XII

Comparison of Polymer Properties

| Blends (B)/ Stand-Alone (S-A) | Mn | Mw | Mw/Mn | Brookfield Viscosity cps at 70 wt. % Copolymer in Solvent | Tg °C. |
|---|---|---|---|---|---|
| Ex. 9 (B) | 2080 | 5140 | 2.47 | 2576 | 19 |
| Ex. 10 (B) | 2210 | 5510 | 2.49 | 3144 | 20 |
| Ex. 11 (B) | 2310 | 5850 | 2.53 | 3600 | 24 |
| Ex. 12 (B) | 2440 | 6680 | 2.73 | 4355 | 27 |
| Ex. 13 (B) | 2290 | 6630 | 2.89 | 3700 | 26 |
| Ex. 14 (B) | 2520 | 7010 | 2.78 | 4430 | 22 |
| Ex. 15 (B) | 2660 | 7450 | 2.80 | 5315 | 24 |
| Ex. 16 (B) | 2880 | 8350 | 2.89 | 6660 | 27 |
| Ex. 17 (B) | 2730 | 9750 | 3.57 | 7335 | 25 |
| Ex. 18 (B) | 3050 | 10260 | 3.36 | 9125 | 25 |
| Ex. 19 (B) | 3320 | 10710 | 3.22 | 10700 | 25 |
| Ex. 20 (B) | 3570 | 11630 | 3.26 | 13660 | 27 |
| Ex. F (S-A) | 2000 | 4950 | 2.48 | 3088 | 23 |
| Ex. G (S-A) | 2620 | 7060 | 2.69 | 6130 | 24 |
| Ex. H (S-A) | 3580 | 10870 | 3.03 | 14180 | 23 |

A second important aspect of the polyol blends of the invention is the compatibility of the low Tg copolymer and the high Tg copolymer. This compatibility is established by the fact that when blended, the polyol blends exhibit a single Tg. In order to show the compatibility of the low Tg and high Tg copolymers when blended, samples of blended low Tg and high Tg copolymers were prepared and subjected to Differential Scanning Calorimeter (DSC) scans at a scan rate of 20.00 degrees per minute to establish that the polyol blends provide a single Tg. The resultant scans are shown at FIGS. 2 and 3. The polyol blends used for the DSC scans shown in FIGS. 2 and 3 are as shown in Examples 21 and 22 as follows:

TABLE XIII

Physical Properties of Low-Tg, High-Tg Acrylic Polymers Before Blending

| Copolymers | Composition | Equiv. Wt. | Tg (°C.) | Mn | Mw |
|---|---|---|---|---|---|
| Example 21 | | | | | |
| Low-Tg Copolymer | 10 S/37 MMA/24 BA/29 HEA | 400 | 5 | 1650 | 3180 |
| High-Tg Copolymer | 25 S/47 MMA 14 BA/14 HEA | 800 | 30 | 2330 | 5310 |
| Example 22 | | | | | |
| Low-Tg Copolymer | 10 S/37 MMA/24 BA/29 HEA | 400 | 15 | 2650 | 6280 |
| High-Tg Copolymer | 25 S/47 MMA 14 BA/14 HEA | 800 | 53 | 4050 | 11,850 |

TABLE XIV

Physical Properties of Resultant Polyol Blends

| Blends | Mn | Mw | Equiv. Wt. | Tg °C. |
|---|---|---|---|---|
| Example 21 (Figure 2) | 2040 | 5270 | 600 | 28 |
| Example 22 (Figure 3) | 3310 | 10,880 | 600 | 38 |

Although the invention has been described in detail by referring to certain preferred embodiments, it will be understood that various modifications can be made within the spirit and scope of the invention. The invention is not to be limited except as set forth in the following claims.

We claim:

1. A coating composition comprising:
   a crosslinking agent selected from the group consisting of a polyisocyanate and an amino resin; and
   an acrylic copolymer polyol blend comprising:
      about 5 to about 95 wt.-%, based upon the weight of the polyol blend, of a low-Tg acrylic copolymer having a hydroxyl number of about 112 to about 187, a number-average molecular weight of about 1500 to about 6000, a polydispersity value of no greater than about 5, and a Tg of about 0° C. to about +20° C., wherein the low-Tg acrylic copolymer comprises about 20 to about 50 wt.-% of a hydroxyalkyl acrylate or methacrylate, about 10 to about 40 wt.-% of a non-hydroxy moiety-containing alkyl acrylate, about 20 to about 70 wt.-% of a non-hydroxy moiety-containing alkyl methacrylate, about 0 to about 30 wt.-% of an aromatic moiety-containing comonomer, about 0 to about 5 wt.-% of an alpha, beta-ethylenically unsaturated acid, based on the weight of the low-Tg acrylic copolymer; and
      about 5 to about 95 wt.-%, based on the weight of the polyol blend, of a high-Tg acrylic copolymer having a hydroxyl number of about 35 to about 112, a number-average molecular weight of about 2000 to about 8000, a polydispersity value of no greater than about 5, and a Tg of about 25° C. to about 100° C., wherein the high Tg acrylic copolymer comprises about 7 to about 29 wt.-% of a hydroxyalkyl acrylate or methacrylate, about 20 to about 70 wt.-% of a non-hydroxy moiety-containing alkyl methacrylate, about 0 to about 25 wt.-% of a non-hydroxy moiety-containing alkyl acrylate, about 0 to about 30 wt.-% of an aromatic moiety-containing comonomer, and about 0 to about 5 wt.-% of an alpha, beta-ethylenically unsaturated acid, based on the weight of the high-Tg acrylic copolymer,
   wherein the blend possesses a single, determinable Tg, a determinable weight-average molecular weight and a determinable hydroxyl number,
   wherein the acrylic copolymer blend is characterized as having a relatively lower viscosity than a single acrylic copolymer of comparable Tg, weight-average molecular weight and hydroxyl number,
   and wherein the acrylic copolymer blend further is characterized in that the low-Tg and high-Tg acrylic copolymers are compatible.

2. The coating composition of claim 1 wherein the polyisocyanate is selected from the group consisting of aliphatic polyisocyanates, cycloaliphatic polyisocyanates, aromatic isocyanates, and mixtures thereof.

3. The coating composition of claim 2 wherein the aromatic isocyanate is selected from the group consisting of adducts of toluene diisocyanate, isophorone diisocyanate, and tetramethyl xylene diisocyanate.

4. The coating composition of claim 1 wherein the amino resin is selected from the group consisting of glycolauryl formaldehyde, urea formaldehyde, melamine formaldehyde, and benzoguamine formaldehyde.

* * * * *

UNITED STATES PATENT AND TRADEMARK OFFICE
CERTIFICATE OF CORRECTION

PATENT NO. : 5,098,956

DATED : March 24, 1992

INVENTOR(S) : John E. Blasko et al.

It is certified that error appears in the above-identified patent and that said Letters Patent is hereby corrected as shown below:

Col. 14, lines 27-28, please delete "dispersant", substituting -- dispersants -- in place thereof.

Col. 20, line 42, please delete the phrase "in Table III".

Signed and Sealed this

Seventh Day of July, 1992

Attest:

DOUGLAS B. COMER

*Attesting Officer*      *Acting Commissioner of Patents and Trademarks*